(12) United States Patent
Togino

(10) Patent No.: US 7,748,851 B2
(45) Date of Patent: Jul. 6, 2010

(54) OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 873 days.

(21) Appl. No.: 11/591,147

(22) Filed: Oct. 31, 2006

(65) Prior Publication Data

US 2007/0041104 A1    Feb. 22, 2007

(30) Foreign Application Priority Data

Nov. 1, 2005    (JP)    ............... 2005-318392

(51) Int. Cl.
*G03B 21/26*    (2006.01)

(52) U.S. Cl. ............... 353/94; 353/30; 359/725; 359/859; 359/857; 359/864; 359/871; 352/69; 352/70

(58) Field of Classification Search ............ 353/7, 353/46, 30, 94; 359/859, 857, 858, 864, 359/871, 479, 471, 472, 478, 631, 728, 364, 359/630, 869, 839, 727, 13, 14, 725; 352/69, 352/70

See application file for complete search history.

(56) References Cited

U.S. PATENT DOCUMENTS

| | | | |
|---|---|---|---|
| 3,283,653 A | | 11/1966 | Tokarzewski |
| 3,552,820 A | | 1/1971 | Brachvogel |
| 3,688,218 A | * | 8/1972 | Gleason ............... 372/99 |
| 4,026,641 A | * | 5/1977 | Bosserman et al. ...... 359/869 |
| 5,473,474 A | | 12/1995 | Powell |
| 5,594,588 A | * | 1/1997 | Togino ............... 359/631 |
| 5,663,833 A | * | 9/1997 | Nanba et al. ........... 359/631 |
| 6,084,715 A | * | 7/2000 | Aoki et al. ............ 359/627 |
| 6,134,051 A | * | 10/2000 | Hayakawa et al. ....... 359/630 |
| 6,597,520 B2 | | 7/2003 | Wallerstein et al. |
| 6,611,282 B1 | | 8/2003 | Trubko et al. |
| 2004/0008423 A1 | | 1/2004 | Driscoll, Jr. et al. |

FOREIGN PATENT DOCUMENTS

JP    6-85019    3/1994

* cited by examiner

*Primary Examiner*—Georgia Y Epps
*Assistant Examiner*—Sultan Chowdhury
(74) *Attorney, Agent, or Firm*—Kenyon & Kenyon LLP

(57) ABSTRACT

The invention relates to an optical system adapted to project a cylindrical, spherical, conical or other three-dimensional display surface onto every direction in the distance or receive images from every direction at such a three-dimensional imaging surface. The optical system is adapted to project a three-dimensional object surface 3 onto a full circle in the distance, and comprises at least one rotationally symmetric reflective surface 2.

10 Claims, 15 Drawing Sheets

FIG. 4
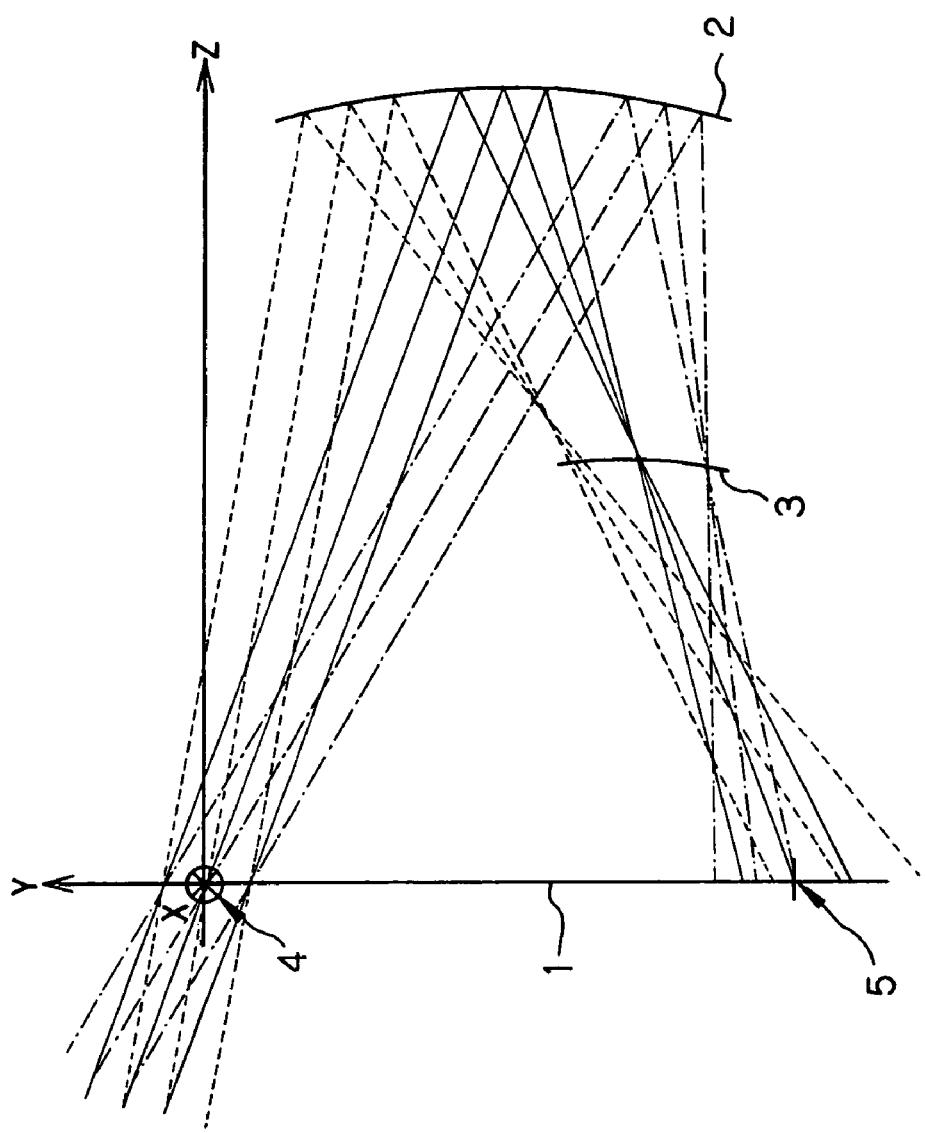

FIG. 6
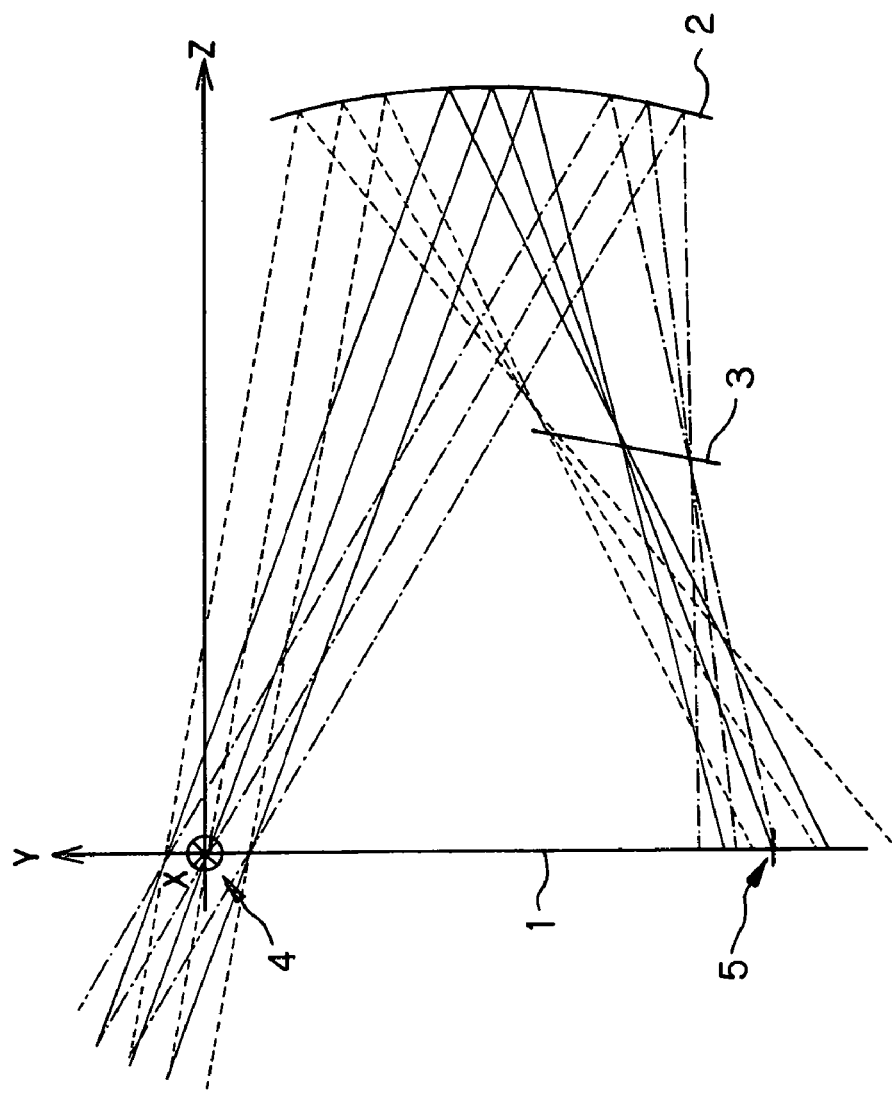

FIG. 10
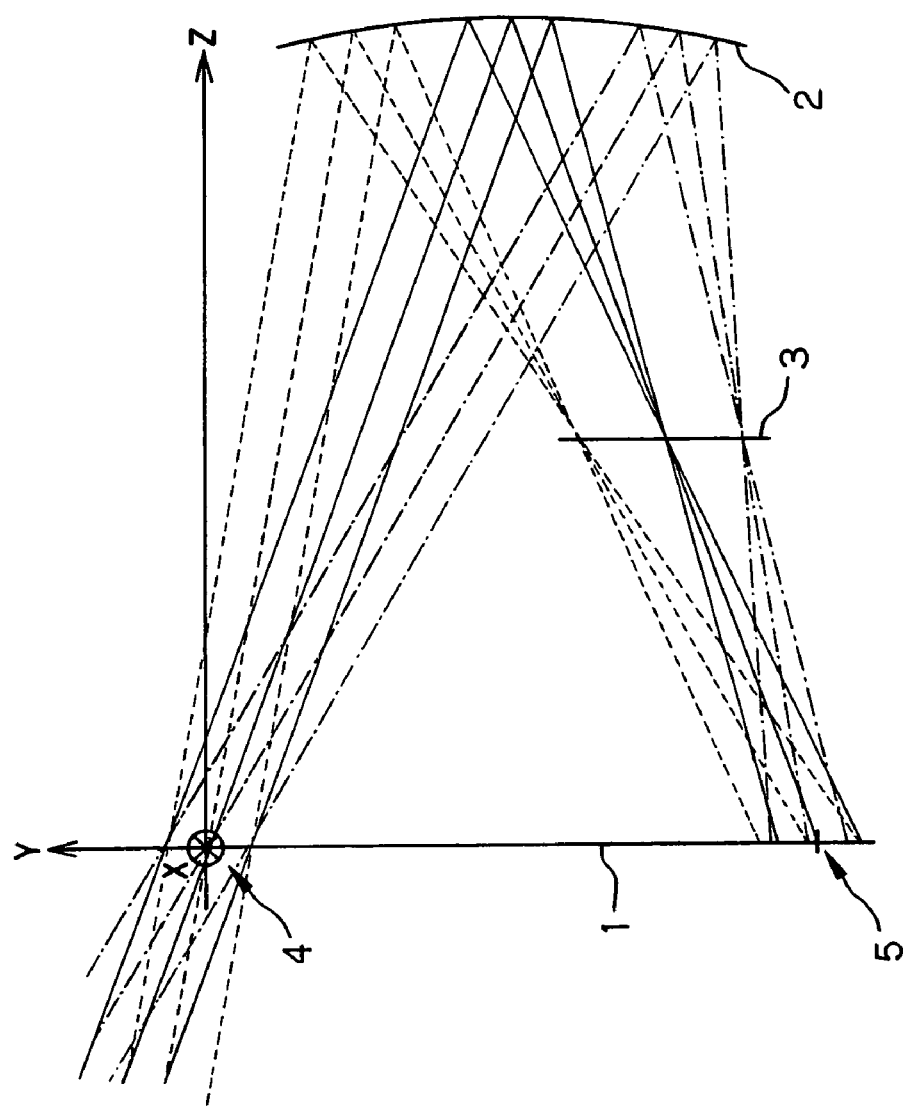

FIG. 12
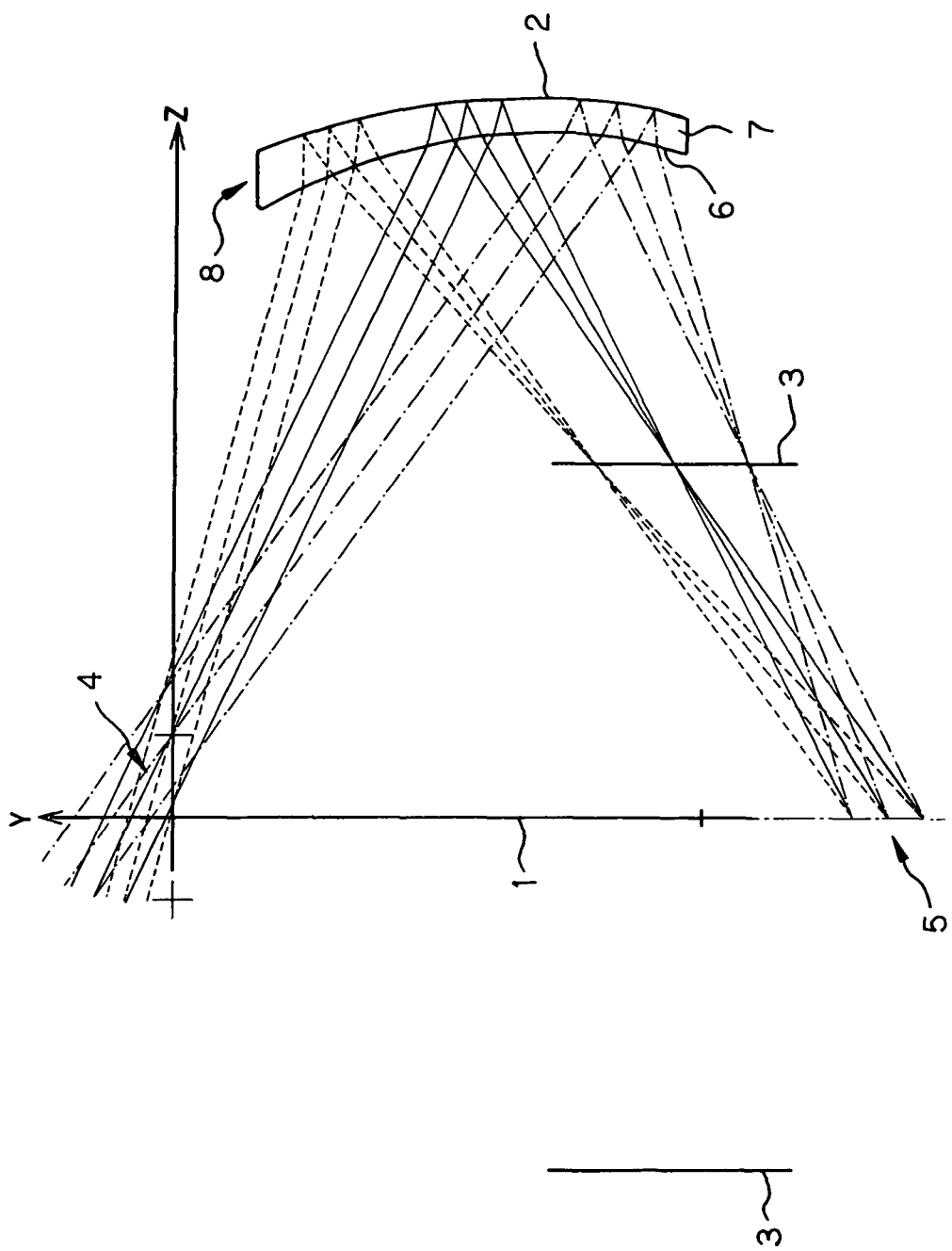
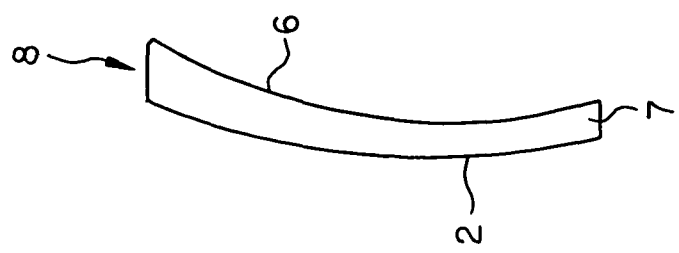

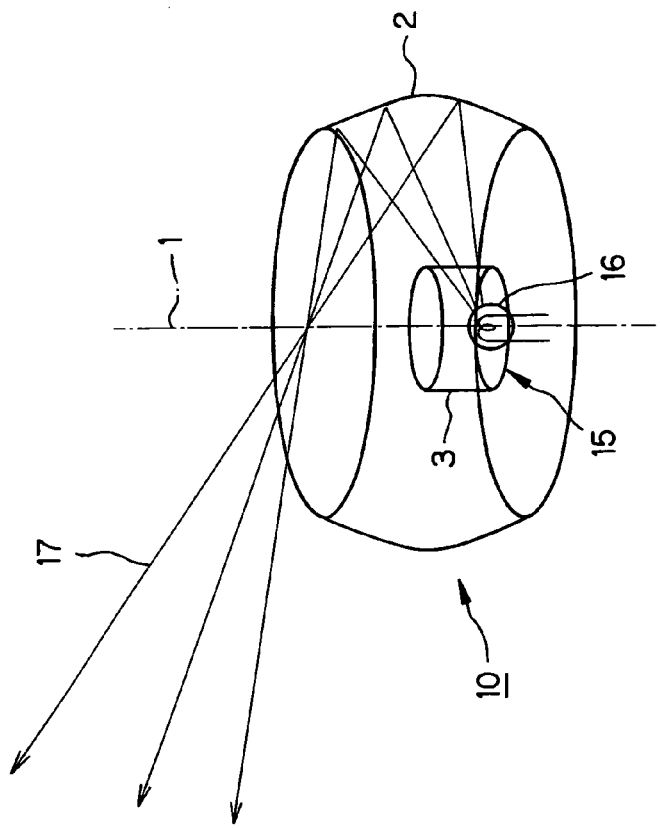
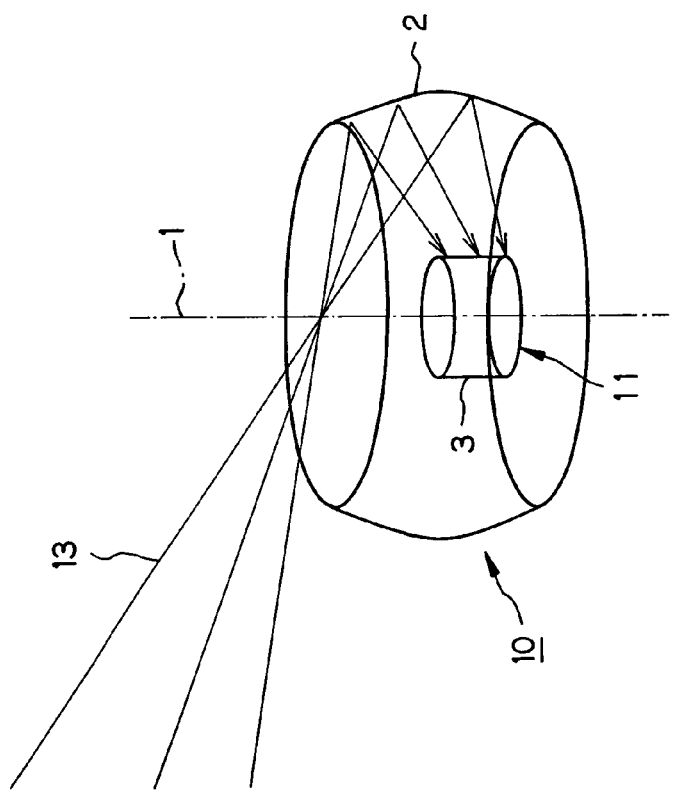
FIG. 15(a)
FIG. 15(b)

OPTICAL SYSTEM

This application claims benefit of Japanese Application No. 2005-318392 filed in Japan on Nov. 1, 2005, the contents of which are incorporated by this reference.

BACKGROUND OF THE INVENTION

The present invention relates generally to an optical system, and more specifically to an optical system adapted a three-dimensional display surface such as a cylindrical, spherical, conical or other three-dimensional display surface in every direction in the distance or to receive images from every direction at a cylindrical, spherical, conical or other three-dimensional imaging surface.

For the projection of images onto a full 360° screen, the linking of images from multiple projectors to one another has been implemented, or a wide-angle optical system such as a fisheye lens has been used. Such prior arts, for instance, are set forth in the following publications.
Patent Publication 1
United States Patent Application No. 2004/8423
Patent Publication 2
JP-B 6-85019
Patent Publication 3
U.S. Pat. No. 5,473,474
Patent Publication 4
U.S. Pat. No. 3,283,653
Patent Publication 5
U.S. Pat. No. 3,552,820
Patent Publication 6
U.S. Pat. No. 6,611,282
Patent Publication 7
U.S. Pat. No. 6,597,520

For the projection or formation of images in or from the full 360° direction, they have so far been projected from one single or multiple planes onto a cylindrical or spherical surface, or vice versa; until now, however, nothing is known about the projection of images from, for instance, a cylindrical, spherical or conical surface onto a cylindrical or spherical surface or vice versa.

In this connection, as can be seen from organic EL devices, future display or imaging devices are fairly likely to have a display or imaging surface defined by a cylindrical, spherical, conical or other rotationally symmetric surface.

SUMMARY OF THE INVENTION

In view of such prior art situations as described above, an object of the present invention is to provide an optical system adapted to project a cylindrical, spherical, conical or other three-dimensional display surface in every direction in the distance or receive images from every direction at such a three-dimensional imaging surface.

According to the invention, this object is achieved by the provision of an optical system adapted to project a rotationally symmetric, three-dimensional object surface in every direction in the distance, characterized by comprising at least one rotationally symmetric reflective surface.

Preferably in this case, at least one of the rotationally symmetric reflective surfaces has positive power.

Preferably, said optical system comprises, in order from back ray tracing, an entrance pupil and an exit pupil on or near an axis of rotational symmetry, and an image plane to which said at least one reflective surface and said object surface correspond and which is located off said axis of rotational symmetry, with an optical path taking on a decentered optical path form where light travels the entrance pupil, the reflective surface, the image plane and the exit pupil in this order.

Said reflective surface could have a rotationally symmetric shape defined by a toric surface, a rotationally symmetric shape defined by rotation about the axis of rotational symmetry of a line segment of any desired shape that has no plane of symmetry in a section including the axis of rational symmetry, or a rationally symmetric shape defined by rotation about the axis of rotational symmetry of a line segment of any desired shape that includes an odd-numbered term in a section including the axis of rotational symmetry. And of course, a spherical surface could be used.

Preferably, said object surface is a rotationally symmetric curved surface such as a cylindrical, spherical or conical surface.

Here let EP be the distance along the axis of rotational symmetry from an entrance pupil position to an exit pupil position and Rr be the distance from the axis of rotational symmetry to said at least one reflective surface. It is then preferable to satisfy the following condition:

$$0.1 < EP/Rr < 10$$

At least one of said reflective surfaces could be made up of a back-surface mirror.

If the object surface and the projection plane are reversed, said object system could be used as an imaging system.

According to the invention as recited above, it is possible to obtain a small-format projection optical system with well corrected aberrations and good resolution, which is capable of projecting a three-dimensional display surface in particular, for instance, a cylindrical, spherical or conical display surface in every direction.

It is also possible to obtain a small-format imaging optical system with well corrected aberrations and good resolution, which is capable of receiving images from every direction at such a three-dimensional imaging surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is illustrative in section of the optical system of Example 2 according to the invention, as taken along the axis of rotational symmetry.

FIG. 6 is illustrative in section of the optical system of Example 3 according to the invention, as taken along the axis of rotational symmetry.

FIG. 10 is illustrative in section of the optical system of Example 5 according to the invention, as taken along the axis of rotational symmetry.

FIG. 12 is illustrative in section of the optical system of Example 6 according to the invention, as taken along the axis of rotational symmetry.

FIG. 15(a) is illustrative in schematic of an optical path in the event that the optical system of the invention is used as a panoramic taking optical system, and FIG. 15(b) is illustrative in schematic of an optical path in the event that it is used as a panoramic projection optical system.

DESCRIPTION OF THE PREFERRED EMBODIMENT

The optical system of the invention is now explained with reference to examples. In principles, when it is a projection system, it will be explained with reference to back ray tracing, and when it is an imaging system, it will be explained with reference to normal ray tracing.

If images displayed on a display device having a cylindrical display surface can be projected onto a full 360° circle in the distance, it is then possible to make a projection system simple and small. When the projection system is built up of transmission lenses as usual, there is one possible approach where multiple projection lens systems are located around a cylindrical display surface in a radial fashion to project images to a full circle. With this approach, however, it would be impossible to link together all the projected images unless the alignment of the transmission lenses is under strict control.

In the case of an imaging system, it is possible to make a taking system simple and small by taking images from the full 360° directions by use of an imaging device having a cylindrical imaging surface. When the imaging system is built up of transmission lenses as usual, there is one possible approach where multiple projection lens systems are located around a cylindrical imaging surface in a radial fashion to form images from the full circle on the cylindrical imaging surface. With this approach, however, it would be impossible to link together all images formed on the cylindrical imaging surface unless the alignment of the transmission lenses is under strict control.

Further, the image surface of each optical system (a projection lens system in the event of the projection system, and a taking lens system in the event of the imaging system) is defined by a cylindrical surface that is curved in one direction only; for correction of this, it is necessary to use a rotationally asymmetric optical surface that is difficult to fabricate.

With such an optical system as used in the prior art, images from the full 360° direction are formed as flat, annular images (such display images are formed in the event of the projection system), so such distorted images must be electronically converted into right ones for viewing. In the event of the projection system, on the other hand, the right images must be electronically converted into such annularly distorted ones.

The requirement for the invention, therefore, is to use at least one rotationally symmetric reflective surface for the projection of such a rotationally symmetric, three-dimensional object surface.

Figure 1:
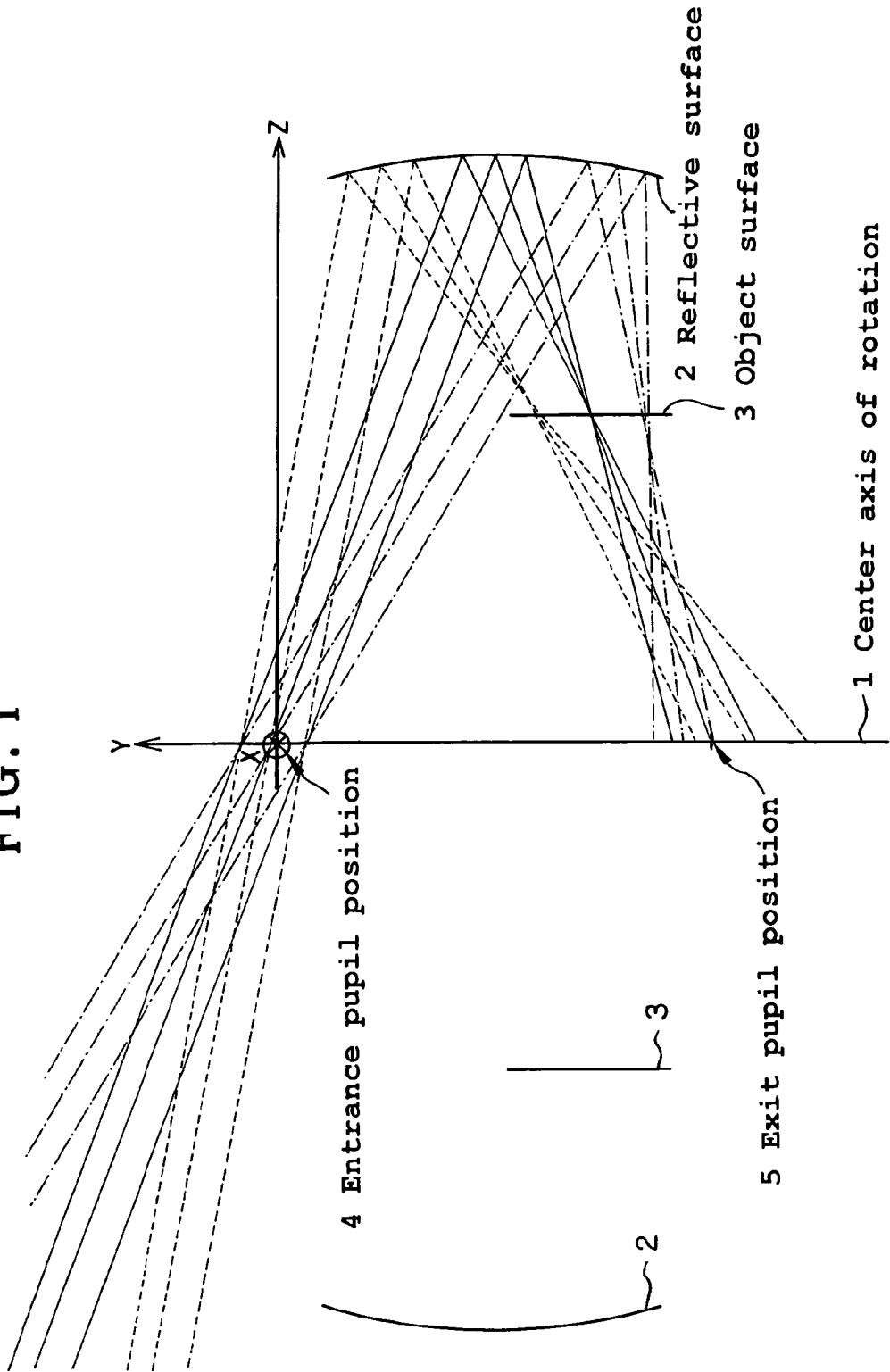
FIG. 1 is illustrative in section of the optical system of Example 1 according to the invention, as taken along the axis of rotational symmetry.

FIG. 1 is illustrative in section of the optical system of Example 1 to be referred to later, inclusive of the center axis of rotation 1 (the axis of rotational symmetry). This optical system is to project an object surface 3 that is of a three-dimensional (cylindrical in Example 1) shape rotationally symmetric about the center axis of rotation 1 to the full circle in the distance, and comprises at least one reflective surface 2 that is rotationally symmetric about the center axis of rotation 1.

More preferably, the rotationally symmetric reflective surface 2 should have positive power, because an image of an object point at infinity can be formed on the cylindrical object surface (the imaging surface in the case of the taking system) 3, or the cylindrical object surface (the display surface in the case of the projection system) 3 can be projected onto an image point at infinity.

Referring further to the imaging system, to prevent the imaging surface itself from cutting off light rays incident from an object on the reflective surface it is important to make use of a decentered arrangement wherein an entrance pupil 4 and an exit pupil 5 are positioned in this order in the direction of the axis of rotational symmetry (the center axis of rotation) 1, and the reflective surface 2 and image surface (object surface) 3 are positioned off the axis of rotational symmetry 1. Preferably in this case, a decentered optical path should be such that light travels the entrance pupil 4, the reflective surface 2, the image surface (object surface) 3 and the exit pupil 5 in this order.

Note here that with such arrangement where a light beam takes on a bent decentered configuration, there is decenteration aberration occurring. Even at the center of a screen in the vertical direction (along the center axis of rotation 1) in particular, asymmetric astigmatism occurs. For correction of this, it is preferable to use as the reflective surface 2 a toric surface rather than a spherical surface, which toric surface varies in curvature between the direction of the axis of rotational symmetry 1 and a direction orthogonal to that direction.

More preferably, the reflective surface should be in a rotationally symmetric configuration defined by the rotation about the axis of rotational symmetry 1 of a line segment of any desired shape that has no plane of symmetry in a section inclusive of the center axis of rotation 1. With that configuration, upper and lower sites of the reflective surface 2 in the direction of the axis of rotational symmetry 1 are allowed to have partly different radii of curvature, making correction of decenteration coma and decentration field curvature possible.

More preferably, the reflective surface 2 should be in a rotationally symmetric configuration defined by the rotation about the axis of rotational symmetry 1 of a line segment of any desired shape having an odd-numbered term in a section inclusive of the center axis of rotation 1, because the degree of flexibility in correction of aberrations can be much higher.

When the optical system of the invention is used as the imaging optical system, it is desired to have an angle limitation means for blocking off unnecessary light rays. For instance, the unnecessary light rays could be blocked off by means of an aperture or the like located on the axis of rotational symmetry 1.

When the optical system of the invention is used as the projection optical system, an illumination means having angle limiting capability is preferably used as the means for illuminating the display surface 3 of the display device so as to limit the angle of light rays leaving the display surface 3 of the display device.

As described above, the present invention provides an optical system capable of projecting images in the full 360° direction; nonetheless, that optical system can be built up of the reflective surface 2 in a rotationally symmetric configuration with respect to the center axis of rotation 1. A rotationally symmetric device can be processed as in a general rotationally symmetric aspheric surface, so it can be fabricated at low costs.

It is more preferable to satisfy the following condition:

$$0.1 < EP/Rr < 10 \tag{1}$$

Here EP is the distance from the position of the entrance pupil 4 to the position of the exit pupil 5 in a direction along the axis of rotational symmetry 1, and Rr is the distance from the axis of rotational symmetry 1 to at least one reflective surface 2.

This condition is about the quantity of decentration of light rays incident on the reflective surface 2. As the lower limit of 0.1 is not reached, the quantity of decentration becomes small with little occurrence of decentration aberration. However, the interference of the display surface (object surface) 3 with the optical path renders it impossible to make sure a large projection angle of view in a vertical direction along the axis of rotational symmetry 1. As the upper limit of 10 is exceeded, there is large decentration aberration occurring, rendering resolving power worse.

Even more preferably, $$0.2 < EP/Rr < 2 \tag{1-1}$$

Set out below are the values of condition (1) in Examples 1-6 given later.

|  | Example | | | | | |
|---|---|---|---|---|---|---|
|  | 1 | 2 | 3 | 4 | 5 | 6 |
| EP/Rr | 0.534 | 0.534 | 0.534 | 0.546 | 0.552 | 0.781 |

Examples 1 to 6 of the invention are now described. Essential parameters for these optical systems will be given later. The essential parameters in Examples 1-6 are based on the results of back ray tracing from an object surface in the distance (which means, not the object surface 3 in FIG. 1, a far object point conjugate to it) through a reference surface set in such a way as to include the center axis of rotation 1 (coordinates X, Y, Z) and then the entrance pupil (stop surface) 4 to the image surface (object surface) 3.

Referring here to a coordinate system for back ray tracing, as shown typically in FIG. 1, the origin of a decentered optical surface in a decentered optical system is defined by a reference surface position with the entrance pupil 4 projected onto the center axis of rotation 1, the Y-axis positive direction is defined by the direction of the center axis 1 of rotation going away from the image surface (object surface) 3, and the Y-Z plane is defined by the sheet plane of FIG. 1. And then, the Z-positive positive direction is defined by a direction opposite to the side of the object surface now considered in the sheet plane of FIG. 1, and the X-axis positive direction is defined by an axis that forms a right-handed orthogonal coordinate system with the Y-axis and Z-axis.

When it comes to normal ray tracing as shown typically in FIG. 1, the origin of a decentered optical surface in a decentered optical system is defined by a position at which the entrance pupil 6Y is projected onto the rotationally symmetric axis (center axis) 1, the Y-axis positive direction is defined by a direction of the rotationally symmetric axis (center axis) 1 away from the image plane 30, and the Y-Z plane is defined by the paper plane of FIG. 1 (or the Z-axis positive direction is defined by an 180°-azimuth direction). Specifically, the Z-axis position direction is defined by a direction facing away from the side of the entrance pupil 6Y considered now in the paper of FIG. 1, and the X-axis positive direction is defined by an axis that forms with the Y- and Z-axes a right-handed orthogonal coordinate system.

For a decentered surface are the quantity of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$(°)) of the coordinate systems for defining the surfaces with the centers on the X-, Y- and Z-axes, respectively. In that case, the positive signs for $\alpha$ and $\beta$ mean counterclockwise rotation with respect to the positive directions of the respective axes, and the positive sign for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a coaxial optical system, there is given a surface spacing. Besides, the radius of curvature of each surface and the refractive index and Abbe number of the medium are given according to common practices.

In this conjunction, an aspheric surface is a rotationally symmetric aspheric surface given by the following defining formula:

$$Z = (Y^2/R)/[1+\{1-(1+k)Y^2/R^2\}^{1/2}] + aY^4 + bY^6 + cY^8 + dY^{10} + \tag{a}$$

Here, Z is an optical axis (axial chief ray) provided that the direction of propagation of light is taken as positive, Y is a direction vertical to that optical axis, R is a paraxial radius of curvature, k is a conical coefficient, and a, b, c, d are the fourth-, sixth-, eighth-, tenth-order aspheric coefficients, respectively. The Z-axis in this defining formula becomes the axis of the rotationally symmetric aspheric surface.

The term "toric surface" here includes an X toric surface and a Y toric surface, as defined below. It is here noted that a straight line passing through the origin of surface shape and vertical to an optical surface provides the axis of the toric surface. On an XYZ orthogonal coordinate system with respect to the origin of surface shape, the X toric surface is given by $$F(X) = Cx \cdot X^2/[1+\{1-(1+k)Cx^2 \cdot X^2\}^{1/2}] + aX^4 + bX^6 + cX^8 + dX^{10}$$

$$Z = F(X) + (1/2)Cy\{Y^2 + Z^2 - F(X)^2\} \tag{b}$$

A curve F(X) is rotated about an axis passing through the Y-axis direction curvature Cy in the Z-axis direction and parallel with the X-axis is rotated. The resultant surface becomes an aspheric surface in the X-Z plane, and a circle in the Y-Z plane.

The Y toric surface is given by $$F(Y)=Cy\cdot Y^2/[1+\{1-(1+k)Cy^2\cdot Y^2\}^{1/2}]+aY^4+bY^6+cY^8+dY^{10}$$

$$Z=F(Y)+(\tfrac{1}{2})Cx\{X^2+Z^2-F(Y)^2\} \quad (c)$$

A curve F(Y) is rotated about an axis passing through the X-axis direction curvature Cy in the Z-axis direction and parallel with the Y-axis is rotated. The resultant surface becomes an aspheric surface in the Y-Z plane, and a circle in the X-Z plane.

Note here that Z is the quantity of a displacement from a tangential plane with respect to the origin of surface shape, Cx is the X-axis direction curvature, Cy is the Y-axis direction curvature, k is a conical coefficient, and a, b, c and d are aspheric coefficients, and that between the X-axis direction radius of curvature Rx and Y-axis direction radius of curvature Ry and the curvatures Cx and Cy, there are the relations:

$$Rx=1/Cx, Ry=1/Cy$$

The extended rotation free-form surface is a rotationally symmetric surface given by the following definition.

First, there is given the following curve (b) passing on a Y-Z coordinate plane through its origin.

$$Z=(Y^2/RY)/[1+\{1-(C_1+1)Y^2/RY^2\}^{1/2}]C_2Y+C_3Y^2+C_4Y^3+C_5Y^4+C_6Y^5+C_7Y^6+\ldots+C_{21}Y^{20}+\ldots+C_{n+1}Y^n+\ldots \quad (d)$$

Then, there is a curve F(Y) given where the curve (d) is rotated by an angle θ (°) with left-handed rotation defined as positive relative to the X-axis positive direction. This curve F(Y), too, passes on the Y-Z coordinate plane through the origin.

That curve F(Y) is parallel translated by a distance R in the Z-positive direction (in the Z-negative direction in the case of a negative sign), and the parallel translated curve is then rotated about the Y-axis. The thus obtained rotationally symmetric surface gives an extended rotation free-from surface.

As a consequence, the extended rotation free-form surface provides a free-form surface (smooth curve) in the Y-Z plane, and a circle with a radius |R| in the X-Z plane.

From this definition, the Y-axis becomes the axis of the extended rotation free-form surface.

Here, RY is the radius of curvature of a spherical term in the Y-Z section, $C_1$ is a conical constant, and $C_2, C_3, C_4, C_5, \ldots$ are the first-, second-, third- and fourth-order aspheric coefficients, respectively.

In this regard, it is noted that a cylindrical surface (Y cylindrical surface) with an axis parallel with the Y-axis as the center axis is given as one Y-toric surface; there is a Y toric surface of Rx=(the radius of the cylindrical surface) given provided that Ry=∞, and k, a, b, c, d, etc.=0.

It is also noted that a conical surface with an axis parallel with the Y-axis as the center axis is given as one extended rotation free-form surface; it is given in terms of RY=∞, $C_1$, $C_2, C_3, C_4, C_5$, etc.=0, θ=(the angle of inclination of the conical surface), and R=(the radius of the base in the X-X plane).

Further, a term relating to an aspheric surface with no data given in the essential parameters described later is zero. The refractive index and Abbe number are given on a d-line basis (of 587.56 nm wavelength), and length is given in mm. The decentration of each surface is represented in terms of the quantity of decentration from the reference surface.

EXAMPLE 1

Figure 2:
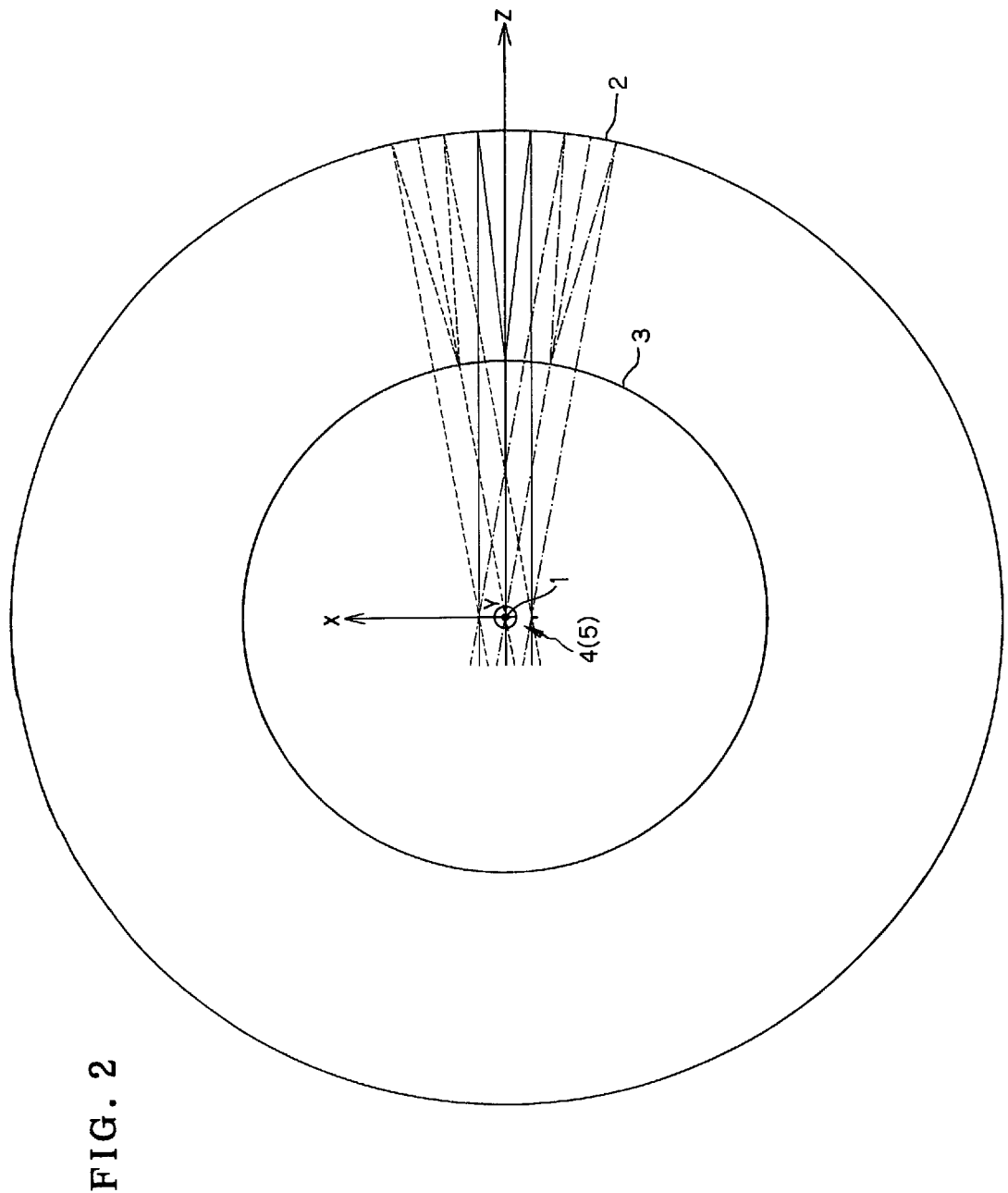
FIG. 2 is a plan view as taken in a direction along the axis of rotational symmetry, illustrative of an optical path through the optical system of Example 1.
Figure 3:
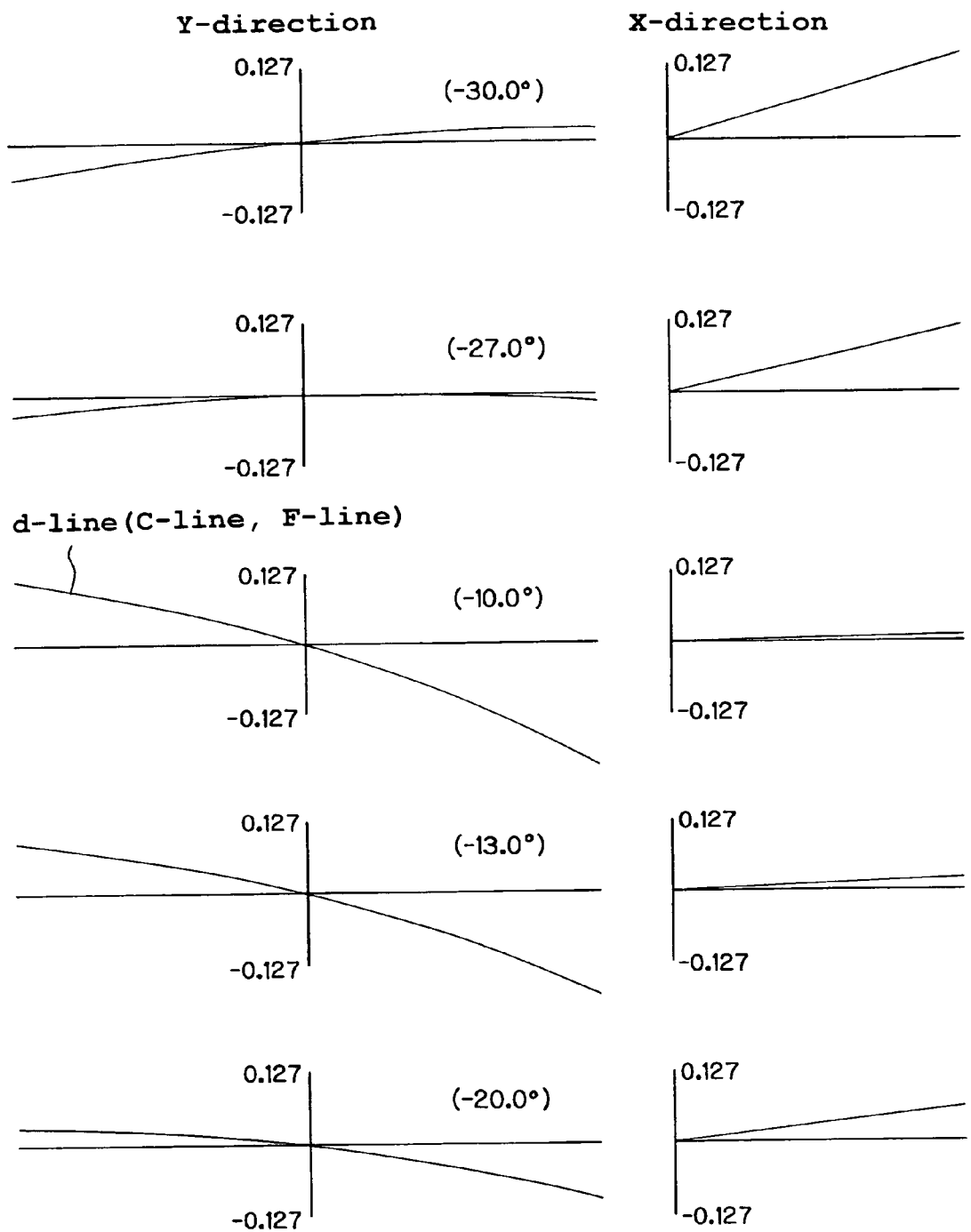
FIG. 3 is a transverse aberration diagram for the whole optical system of Example 1.

FIG. 2 is a sectional view of the optical system of Example 1 as taken along the center axis of rotation 1, FIG. 2 is a plan view of an optical path through that optical system as viewed along the center axis of rotation 1, and FIG. 3 is a transverse aberration diagram for the whole optical system according to Example 1. In this transverse aberration diagram, the angles right in the middle are indicative of the angles of view in the vertical direction, and Y-direction (meridional) and X-direction (sagittal) transverse aberrations at those angles of view are indicated. Throughout the disclosure, a minus angle of view means a right-handed rotation angle with respect to the X-axis positive direction.

The example here is directed to a projection optical system built up of one reflective surface 2, and the reflective surface 2 is made up of a spherical surface having positive power. A display surface (object surface; image surface) 3 is made up of a cylindrical surface. The reflective surface 2 and the display surface (object surface; image surface) 3 have a rotationally symmetric surface configuration with respect to the center axis of rotation 1. And then, an entrance pupil 4 and an exit pupil 5 are located at a distance on the Y-axis of the axis of rotational symmetry (the center axis of rotation) 1.

As viewed according to back ray tracing, a light beam from an object point at infinity (the projection surface in the case of normal ray tracing) passes through the entrance pupil 4, incident on the decentered reflective surface 2 obliquely with respect to the Y-axis, that is, by way of a decentered optical path. Upon reflection at the reflective surface 2, the light beam travels toward the exit pupil 5 away from the entrance pupil 4 on the Y-axis. In the meantime, the light beam is incident on the image surface (display surface; object surface) 3, where an image of the object point is formed.

With such decentered arrangement, projection light from the display surface 3 is reflected at the reflective surface 2 without interfering with the display surface 3, so that it can be projected in the full 360° directions in the range of 20° in the vertical angle of view of 10° to 30°.

The specifications of Example 1 are:

| | |
|---|---|
| Horizontal angle of view: | 360° |
| Vertical angle of view: | 20° |
| Entrance pupil diameter: | 2.00 mm |
| Image size: | Cylindrical surface of ɸ 20.00 mm and 3.09 mm in height |

EXAMPLE 2

Figure 5:
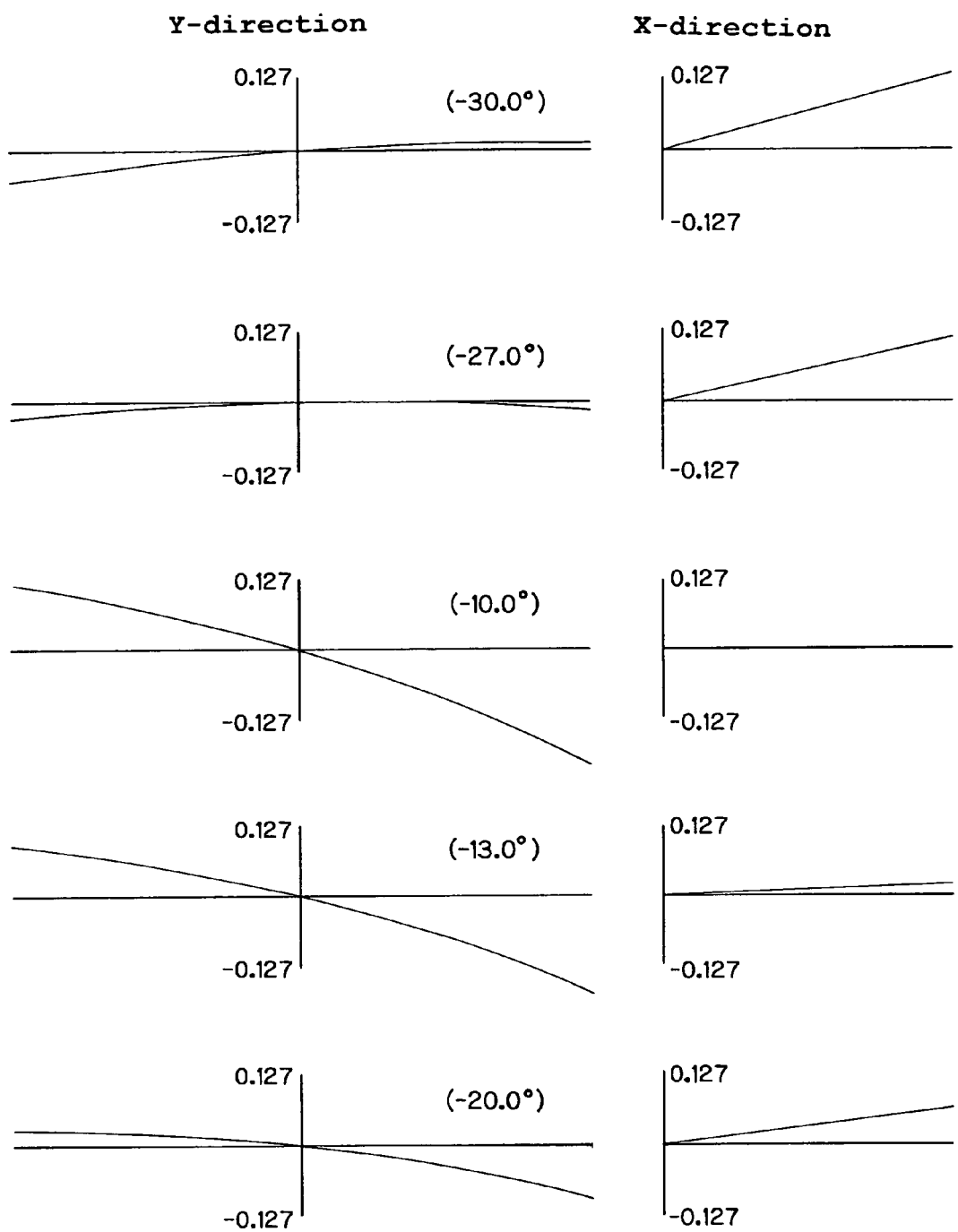
FIG. 5 is a transverse aberration diagram for the whole optical system of Example 2.

FIG. 4 is a sectional view of the optical system of Example 2 as taken along the center axis of rotation 1, and FIG. 5 is a transverse aberration diagram for the whole optical system according to Example 2.

The example here is directed to a projection optical system built up of one reflective surface 2, and the reflective surface 2 is made up of a spherical surface having positive power. A display surface (object surface; image surface) 3 is made up of a spherical surface. The reflective surface 2 and the display surface (object surface; image surface) 3 have a rotationally symmetric surface configuration with respect to the center axis of rotation 1. And then, an entrance pupil 4 and an exit pupil 5 are located at a distance on the Y-axis of the axis of rotational symmetry (the center axis of rotation) 1.

As viewed according to back ray tracing, a light beam from an object point at infinity (the projection surface in the case of normal ray tracing) passes through the entrance pupil 4, incident on the decentered reflective surface 2 obliquely with respect to the Y-axis, that is, by way of a decentered optical path. Upon reflection at the reflective surface 2, the light beam travels toward the exit pupil 5 away from the entrance pupil 4 on the Y-axis. In the meantime, the light beam is incident on the image surface (display surface; object surface) 3, where an image of the object point is formed.

With such decentered arrangement, projection light from the display surface 3 is reflected at the reflective surface 2 without interfering with the display surface 3, so that it can be projected in the full 360° directions in the range of 20° in the vertical angle of view of 10° to 30°.

The specifications of Example 2 are:

| | |
|---|---|
| Horizontal angle of view: | 360° |
| Vertical angle of view: | 20° |
| Entrance pupil diameter: | 2.00 mm |
| Image size: | Spherical surface of φ 20.00 mm and 3.04 mm in height |

With the embodiment here, field curvature occurring at the concave mirror 2 can be corrected because the display surface 3 is spherical.

EXAMPLE 3

Figure 7:
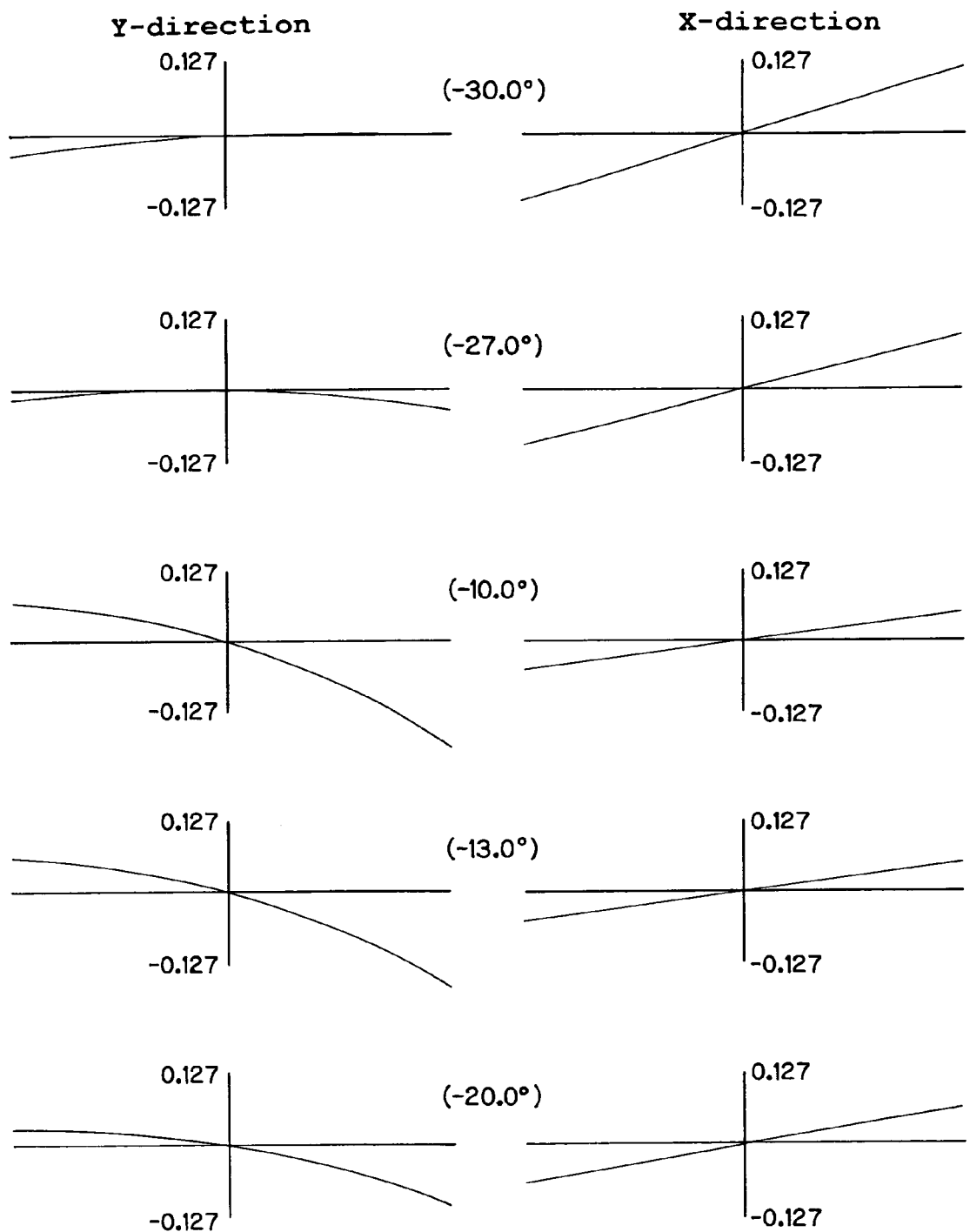
FIG. 7 is a transverse aberration diagram for the whole optical system of Example 3.

FIG. 6 is a sectional view of the optical system of Example 3 as taken along the center axis of rotation 1, and FIG. 7 is a transverse aberration diagram for the whole optical system according to Example 3.

The example here is directed to a projection optical system built up of one reflective surface 2, and the reflective surface 2 is made up of a spherical surface having positive power. A display surface (object surface; image surface) 3 is made up of a conical surface. The reflective surface 2 and the display surface (object surface; image surface) 3 have a rotationally symmetric surface configuration with respect to the center axis of rotation 1. And then, an entrance pupil 4 and an exit pupil 5 are located at a distance on the Y-axis of the axis of rotational symmetry (the center axis of rotation) 1.

As viewed according to back ray tracing, a light beam from an object point at infinity (the projection surface in the case of normal ray tracing) passes through the entrance pupil 4, incident on the decentered reflective surface 2 obliquely with respect to the Y-axis, that is, by way of a decentered optical path. Upon reflection at the reflective surface 2, the light beam travels toward the exit pupil 5 away from the entrance pupil 4 on the Y-axis. In the meantime, the light beam is incident on the image surface (display surface; object surface) 3, where an image of the object point is formed.

With such decentered arrangement, projection light from the display surface 3 is reflected at the reflective surface 2 without interfering with the display surface 3, so that it can be projected in the full 360° directions in the range of 20° in the vertical angle of view of 10° to 30°.

The specifications of Example 3 are:

| | |
|---|---|
| Horizontal angle of view: | 360° |
| Vertical angle of view: | 20° |
| Entrance pupil diameter: | 2.00 mm |
| Image size: | Conical surface of φ 20.00 mm and 3.40 mm in height |

With the example here, it is possible to make correction of a tilt of the image surface due to decnetration aberration. The display device is relatively easily built up by rounding a fan-form flexible display device blank.

EXAMPLE 4

Figure 8:
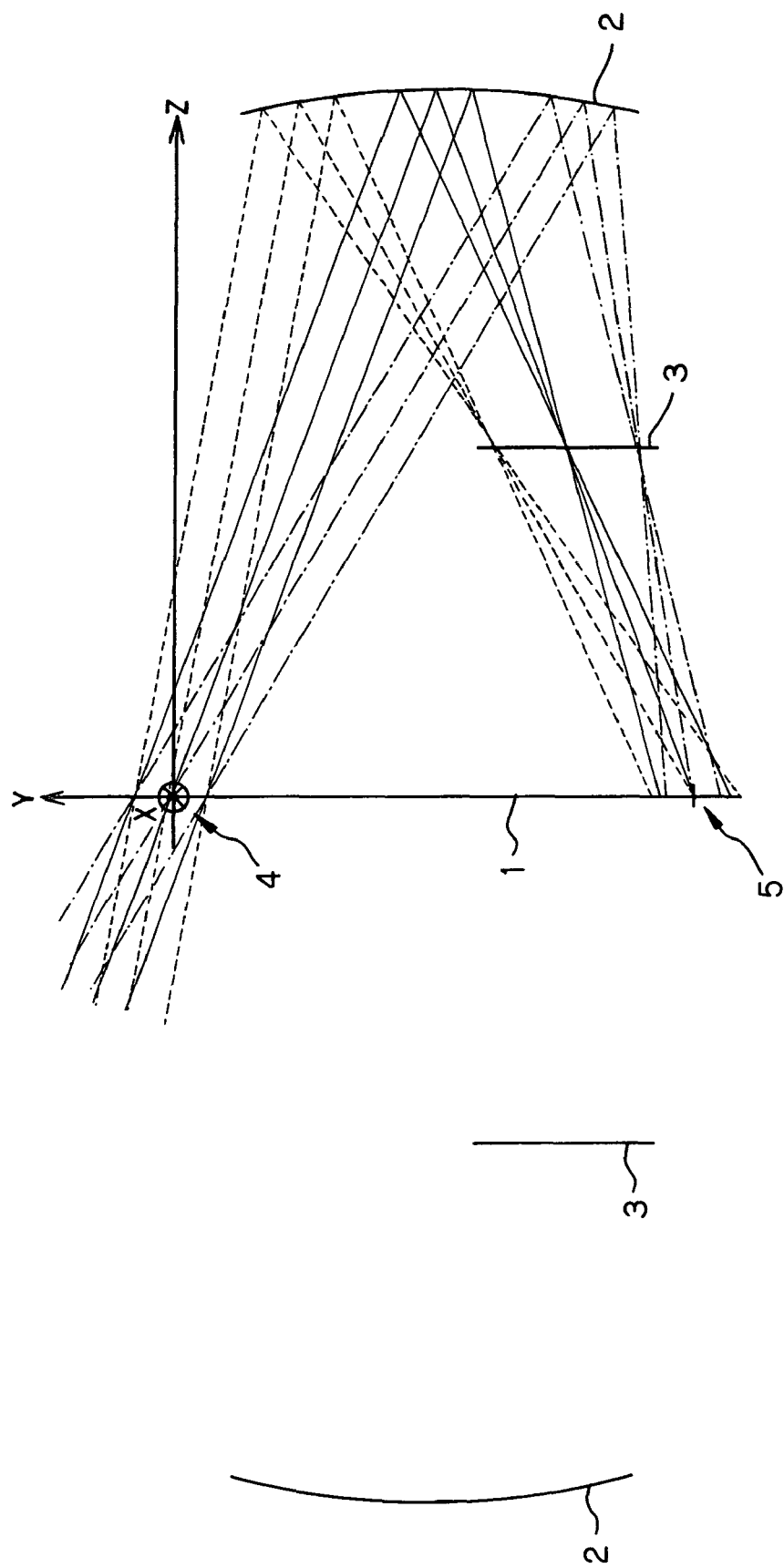
FIG. 8 is illustrative in section of the optical system of Example 4 according to the invention, as taken along the axis of rotational symmetry.
Figure 9:
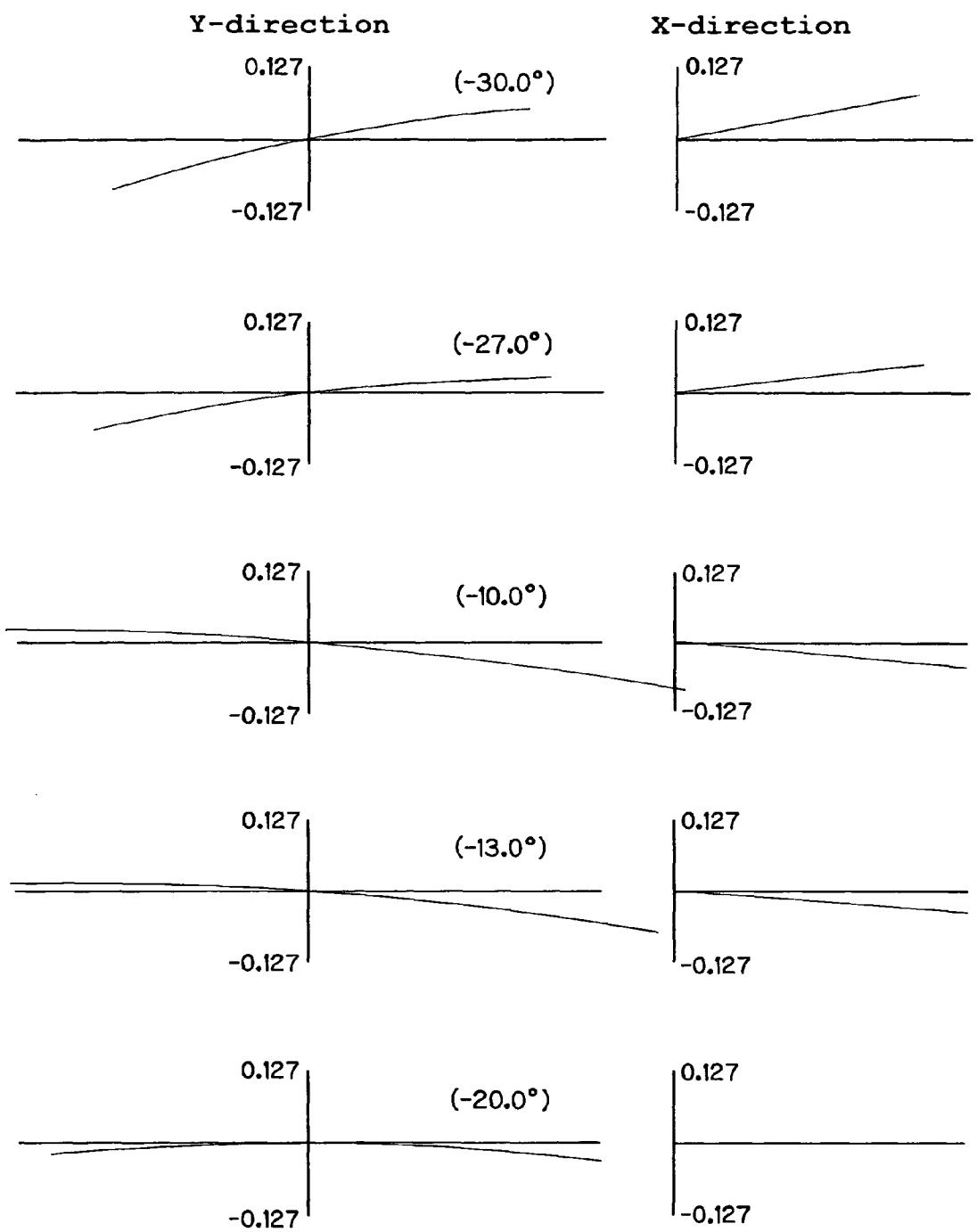
FIG. 9 is a transverse aberration diagram for the whole optical system of Example 4.

FIG. 8 is a sectional view of the optical system of Example 4 as taken along the center axis of rotation 1, and FIG. 9 is a transverse aberration diagram for the whole optical system according to Example 4.

The example here is directed to a projection optical system built up of one reflective surface 2, and the reflective surface 2 is made up of a toric surface having positive power. A display surface (object surface; image surface) 3 is made up of a cylindrical surface. The reflective surface 2 and the display surface (object surface; image surface) 3 have a rotationally symmetric surface configuration with respect to the center axis of rotation 1. And then, an entrance pupil 4 and an exit pupil 5 are located at a distance on the Y-axis of the axis of rotational symmetry (the center axis of rotation) 1.

As viewed according to back ray tracing, a light beam from an object point at infinity (the projection surface in the case of normal ray tracing) passes through the entrance pupil 4, incident on the decentered reflective surface 2 obliquely with respect to the Y-axis, that is, by way of a decentered optical path. Upon reflection at the reflective surface 2, the light beam travels toward the exit pupil 5 away from the entrance pupil 4 on the Y-axis. In the meantime, the light beam is incident on the image surface (display surface; object surface) 3, where an image of the object point is formed.

With such decentered arrangement, projection light from the display surface 3 is reflected at the reflective surface 2 without interfering with the display surface 3, so that it can be projected in the full 360° directions in the range of 20° in the vertical angle of view of 10° to 30°.

The specifications of Example 4 are:

| | |
|---|---|
| Horizontal angle of view: | 360° |
| Vertical angle of view: | 20° |
| Entrance pupil diameter: | 2.00 mm |
| Image size: | Cylindrical surface of φ 20.00 mm and 3.40 mm in height |

In the example here, the reflective surface is built up of a toric surface. To make correction of astigmatism, it is preferable for the toric surface to have a relatively small curvature (relatively large radius of curvature) in the direction of the axis of rotational symmetry (meridional or vertical direction) and a relatively large curvature (relatively small radius of curvature) in the circumferential direction (sagittal or azimuth angle direction).

EXAMPLE 5

Figure 11:
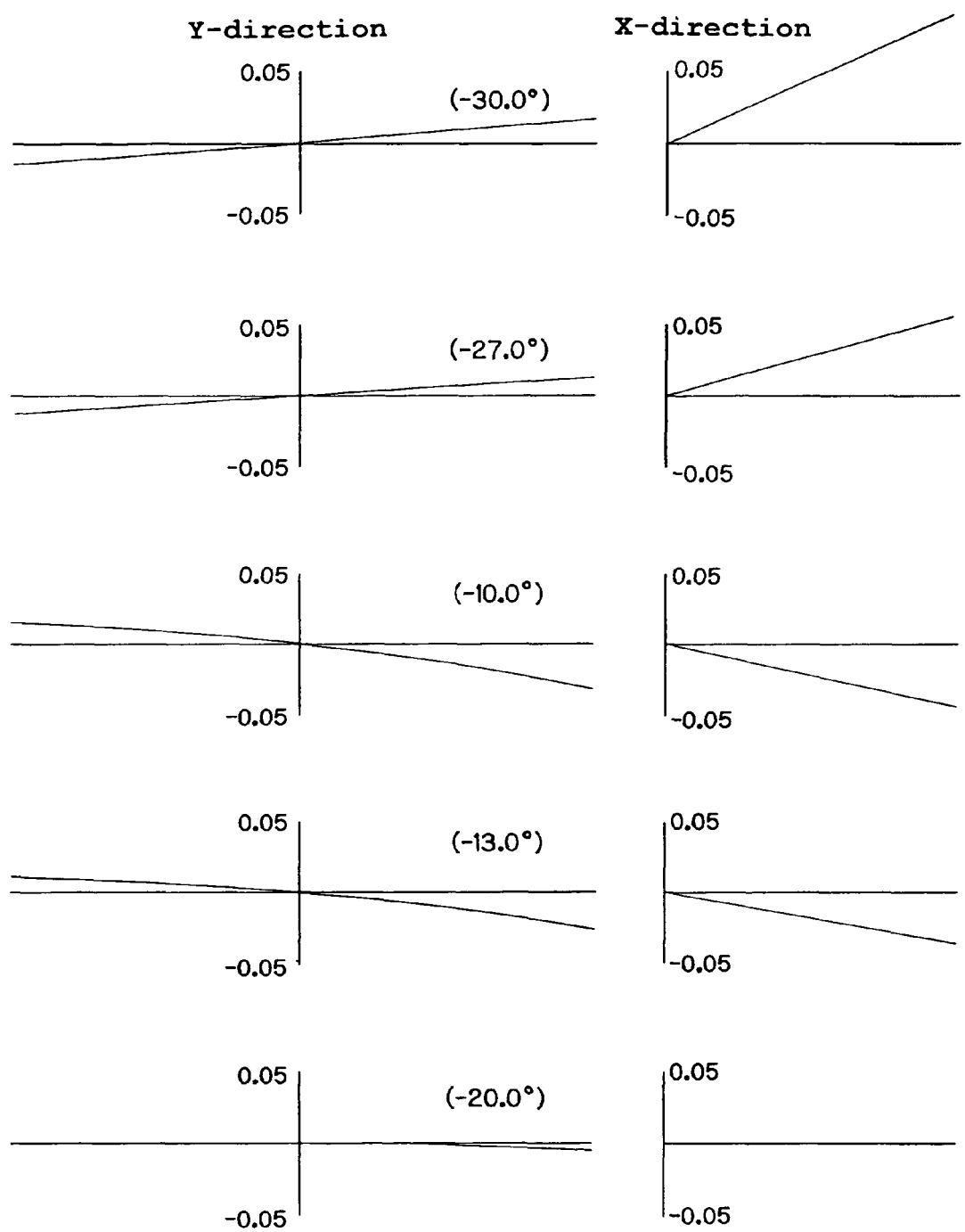
FIG. 11 is a transverse aberration diagram for the whole optical system of Example 5.

FIG. 10 is a sectional view of the optical system of Example 5 as taken along the center axis of rotation 1, and FIG. 11 is a transverse aberration diagram for the whole optical system according to Example 5.

The example here is directed to a projection optical system built up of one reflective surface 2, and the reflective surface 2 is made up of an extended free-form surface of rotation having positive power. A display surface (object surface; image surface) 3 is made up of a cylindrical surface. The reflective surface 2 and the display surface (object surface; image surface) 3 have a rotationally symmetric surface configuration with respect to the center axis of rotation 1. And then, an entrance pupil 4 and an exit pupil 5 are located at a distance on the Y-axis of the axis of rotational symmetry (the center axis of rotation) 1.

As viewed according to back ray tracing, a light beam from an object point at infinity (the projection surface in the case of normal ray tracing) passes through the entrance pupil 4, incident on the decentered reflective surface 2 obliquely with respect to the Y-axis, that is, by way of a decentered optical path. Upon reflection at the reflective surface 2, the light beam travels toward the exit pupil 5 away from the entrance pupil 4 on the Y-axis. In the meantime, the light beam is incident on the image surface (display surface; object surface) 3, where an image of the object point is formed.

With such decentered arrangement, projection light from the display surface 3 is reflected at the reflective surface 2 without interfering with the display surface 3, so that it can be projected in the full 360° directions in the range of 20° in the vertical angle of view of 10° to 30°.

The specifications of Example 5 are:

| | |
|---|---|
| Horizontal angle of view: | 360° |
| Vertical angle of view: | 20° |
| Entrance pupil diameter: | 2.00 mm |
| Image size: | Cylindrical surface of |
| | φ 20.00 mm and 3.89 mm in height |

In the example here, the reflective surface is built up of an extended free-form surface of rotation. To make correction of astigmatism, it is preferable for this surface to have a relatively small curvature (relatively large radius of curvature) in the direction of the axis of rotational symmetry (meridional or vertical direction) and a relatively large curvature (relatively small radius of curvature) in the circumferential direction (sagittal or azimuth angle direction).

Further, it is preferable to have an asymmetric configuration in the vertical direction of the Y-axis using an even-numbered term; that is, in FIG. 10, it is preferable to make the positive power in the Y-axis negative direction strong (decrease the radius of curvature), thereby making correction of a tilt of the image surface in the meridional section.

EXAMPLE 6

Figure 13:
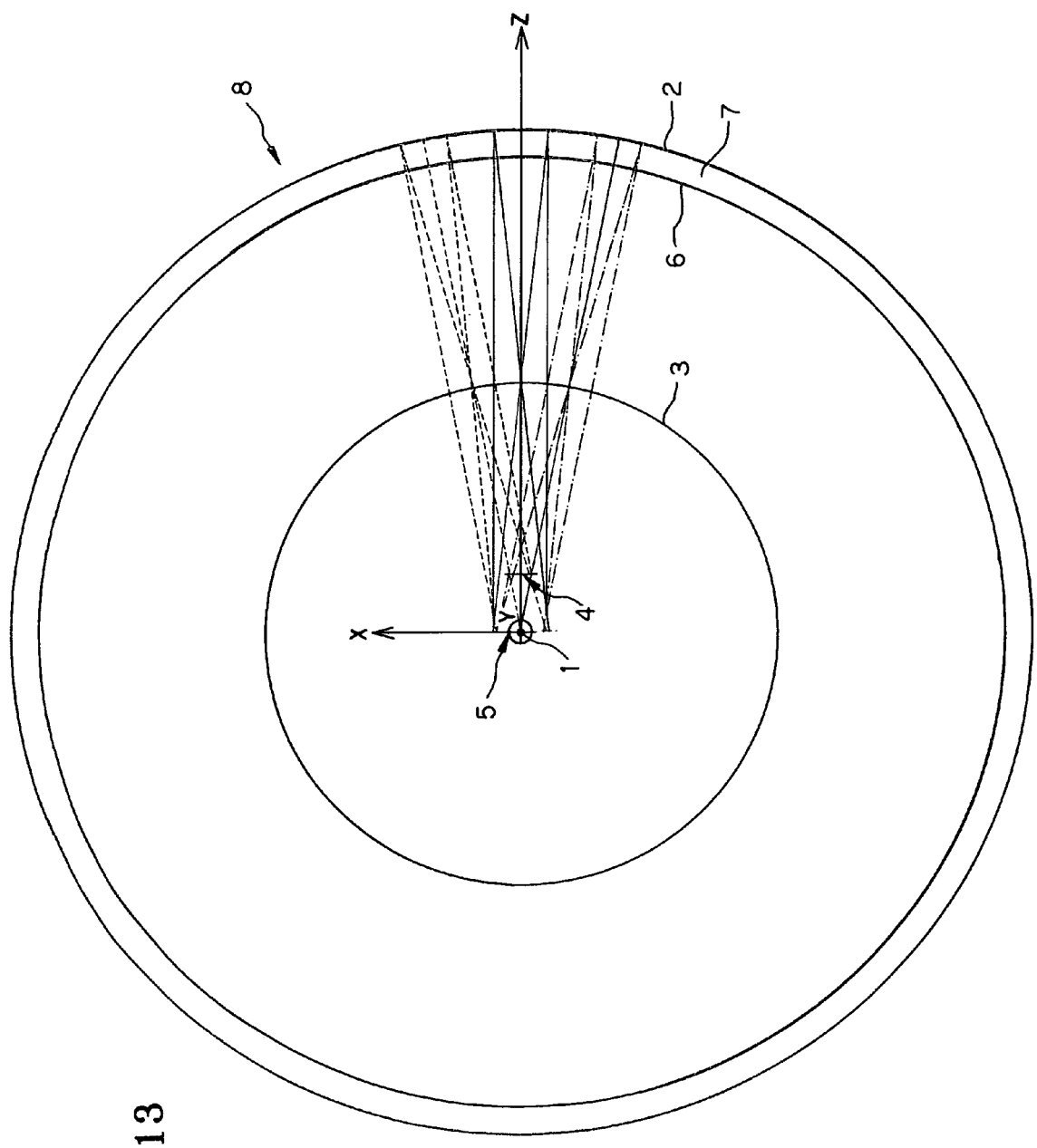
FIG. 13 is a plan view as taken in a direction along the axis of rotational symmetry, illustrative of an optical path through the optical system of Example 6.
Figure 14:
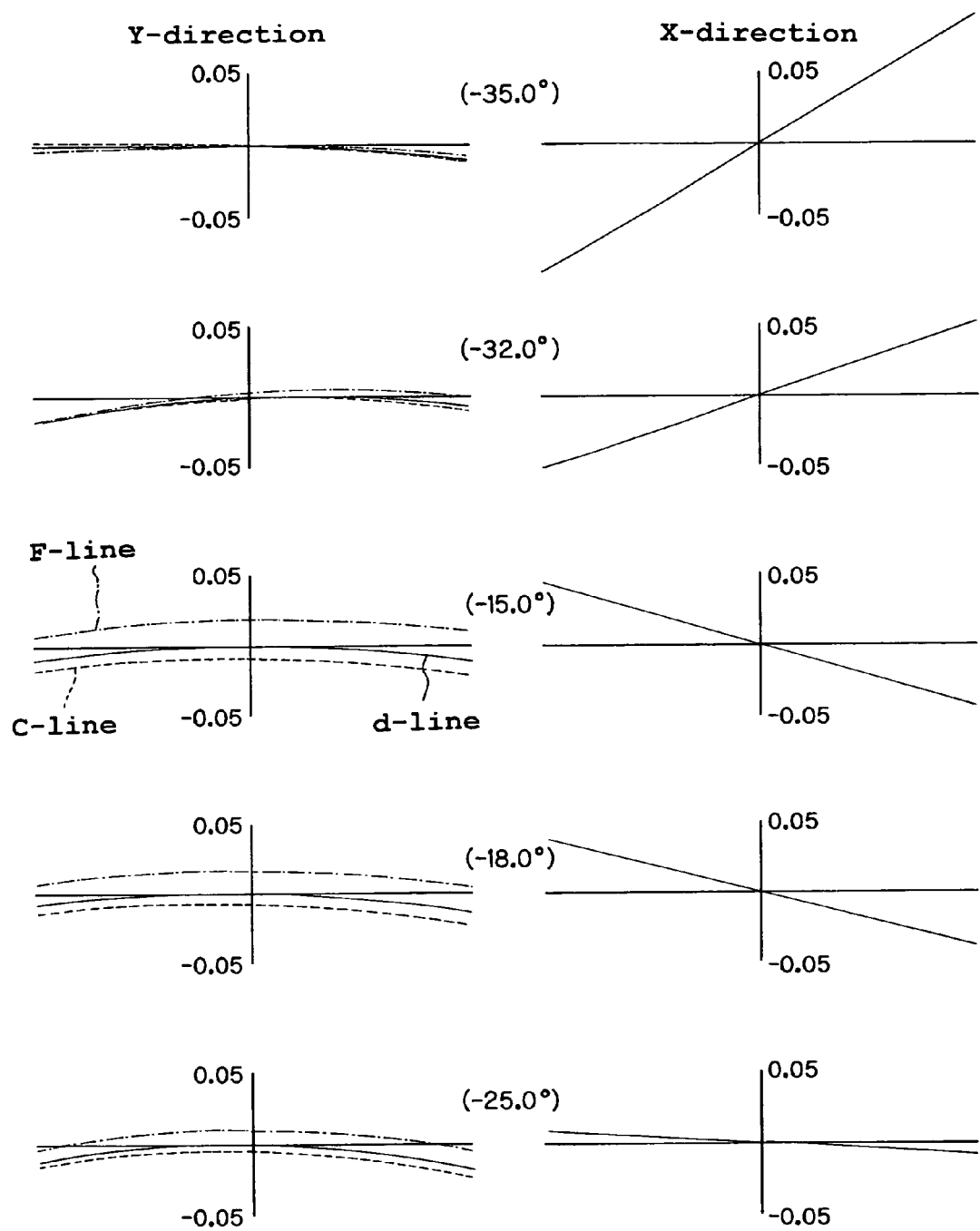
FIG. 14 is a transverse aberration diagram for the whole optical system of Example 6.

FIG. 12 is a sectional view of the optical system of Example 6 as taken along the center axis of rotation 1, FIG. 13 is a plan view of an optical path through that optical system as viewed along the center axis of rotation 1, and FIG. 14 is a transverse aberration diagram for the whole optical system according to Example 1.

The example here is directed to a projection optical system in which one reflective surface 2 is built up of a back-surface mirror 8, and the back-surface mirror 8 is made up of an entrance side refracting surface 6 and a back surface side reflective surface 2 with a transparent medium 7 interposed between them. The refracting surface 6 is formed of an extended free-form surface of rotation having negative power, and the reflective surface 2 is formed of an extended free-form surface of rotation having positive power. The back-surface mirror 8 and the display surface (object surface; image surface) 3 have a rotationally symmetric surface configuration with respect to the center axis of rotation 3. And then, an entrance pupil 4 is located near the axis of rotational symmetry (the center axis of rotation) 1, and an exit pupil 5 is positioned on the axis of rotational symmetry 1 at a mutual distance in the direction of the axis of rotational symmetry 1.

As viewed according to back ray tracing, a light beam from an object point at infinity (the projection surface in the case of normal ray tracing) passes through the entrance pupil 4, incident on the decentered back-surface mirror 8 obliquely with respect to the Y-axis, that is, by way of a decentered optical path. Upon reflection at the reflective surface 2, the light beam travels toward the exit pupil 5 away from the entrance pupil 4 on the Y-axis. In the meantime, the light beam is incident on the image surface (display surface; object surface) 3, where an image of the object point is formed.

With such decentered arrangement, projection light from the display surface 3 is reflected at the back-surface mirror 8 without interfering with the display surface 3, so that it can be projected in the full 360° directions in the range of 20° in the vertical angle of view of 10° to 30°.

The specifications of Example 6 are:

| | |
|---|---|
| Horizontal angle of view: | 360° |
| Vertical angle of view: | 20° |
| Entrance pupil diameter: | 2.00 mm |
| Image size: | Cylindrical surface of |
| | φ 20.00 mm and 4.22 mm in height |

In the example here, the reflective surface 2 is built up of the back-surface mirror 8, and the refracting and reflective surface 6 and 2 that form the back-surface mirror 8 are each configured into a shape having an odd-number term and asymmetric in the vertical direction of the Y-axis. In the following tables, "YTR", "ERFS" and "RE" are indicative of a Y toric surface, an extended rotation free-form surface, and a reflective surface, respectively.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Reference Plane) | | | | |
| 2 | ∞(Entrance Pupil) | | | | |
| 3 | −18.80 (RE) | | (1) | | |
| 4 | ∞(Exit Pupil) | | (2) | | |
| Image plane | YTR[1] | | (3) | | |

| YTR[1] | | | | |
|---|---|---|---|---|
| | Rx | | −10.000 | |
| | Ry | | ∞ | |
| | Displacement and tilt(1) | | | |
| X | 0.00 | Y | −6.84 | Z | 18.80 |
| α | 0.00 | β | 0.00 | γ | 0.00 |
| | Displacement and tilt(2) | | | |
| X | 0.00 | Y | −13.68 | Z | 0.00 |
| α | 0.00 | β | 0.00 | γ | 0.00 |
| | Displacement and tilt(3) | | | |
| X | 0.00 | Y | −10.04 | Z | 10.00 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Reference Plane) | | | | |
| 2 | ∞(Entrance Pupil) | | | | |
| 3 | −18.73 (RE) | | (1) | | |
| 4 | ∞(Exit Pupil) | | (2) | | |
| Image plane | −10.00 | | (3) | | |

| Displacement and tilt(1) | | | | | |
|---|---|---|---|---|---|
| X | 0.00 | Y | −6.82 | Z | 18.73 |
| α | 0.00 | β | 0.00 | γ | 0.00 |
| Displacement and tilt(2) | | | | | |
| X | 0.00 | Y | −13.64 | Z | 0.00 |
| α | 0.00 | β | 0.00 | γ | 0.00 |
| Displacement and tilt(3) | | | | | |
| X | 0.00 | Y | −10.00 | Z | 10.00 |
| α | 0.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Reference Plane) | | | | |
| 2 | ∞(Entrance Pupil) | | | | |
| 3 | −18.73 (RE) | | (1) | | |
| 4 | ∞(Exit Pupil) | | (2) | | |
| Image plane | ERFS[1] | | (3) | | |

| ERFS[1] | |
|---|---|
| RY | ∞ |
| θ | −10.00 |
| R | 10.00 |

| Displacement and tilt(1) | | | | | |
|---|---|---|---|---|---|
| X | 0.00 | Y | −6.82 | Z | 18.73 |
| α | 0.00 | β | 0.00 | γ | 0.00 |
| Displacement and tilt(2) | | | | | |
| X | 0.00 | Y | −13.64 | Z | 0.00 |
| α | 0.00 | β | 0.00 | γ | 0.00 |
| Displacement and tilt(3) | | | | | |
| X | 0.00 | Y | −10.00 | Z | 0.00 |
| α | 0.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Reference Plane) | | | | |
| 2 | ∞(Entrance Pupil) | | | | |
| 3 | YTR[1] (RE) | | (1) | Reflective Surface | |
| 4 | ∞(Exit Pupil) | | (2) | | |
| Image plane | YTR[2] | | (3) | | |

| YTR[1] | |
|---|---|
| Rx | −20.000 |
| Ry | −22.610 |
| k | 0 |

| YTR[2] | |
|---|---|
| Rx | −10.000 |
| Ry | ∞ |

| Displacement and tilt(1) | | | | | |
|---|---|---|---|---|---|
| X | 0.00 | Y | −7.28 | Z | 20.00 |
| α | 0.00 | β | 0.00 | γ | 0.00 |
| Displacement and tilt(2) | | | | | |
| X | 0.00 | Y | −14.56 | Z | 0.00 |
| α | 0.00 | β | 0.00 | γ | 0.00 |
| Displacement and tilt(3) | | | | | |
| X | 0.00 | Y | −10.92 | Z | 10.00 |
| α | 0.00 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Reference Plane) | | | | |
| 2 | ∞(Entrance Pupil) | | | | |
| 3 | ERES[1] (RE) | | (1) | | |
| 4 | ∞(Exit Pupil) | | (2) | | |
| Image plane | YTR[1] | | (3) | | |

| ERFS[1] | |
|---|---|
| RY | −22.73 |
| θ | 0.00 |
| R | 20.04 |
| $C_4$ | $1.2567 \times 10^{-4}$ |
| $C_5$ | $-6.4896 \times 10^{-6}$ |

| YTR[1] | |
|---|---|
| Rx | −9.81 |
| Ry | ∞ |

-continued

| | | Displacement and tilt(1) | | | |
|---|---|---|---|---|---|
| X | 0.00 | Y | −7.22 | Z | 0.00 |
| α | 0.00 | β | 0.00 | γ | 0.00 |
| | | Displacement and tilt(2) | | | |
| X | 0.00 | Y | −14.52 | Z | 0.00 |
| α | 0.00 | β | 0.00 | γ | 0.00 |
| | | Displacement and tilt(3) | | | |
| X | 0.00 | Y | −10.88 | Z | 9.81 |
| α | 0.00 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Reference Plane) | | | | |
| 2 | ∞(Entrance Pupil) | | (1) | | |
| 3 | ERFS[1] | | (2) | 1.5163 | 64.1 |
| 4 | ERFS[2] (RE) | | (3) | 1.5163 | 64.1 |
| 5 | ERESE[1] | | (2) | | |
| 6 | ∞(Exit Pupil) | | (4) | | |
| Image plane | YTR[1] | | (5) | | |

| ERFS[1] | |
|---|---|
| RY | −15.98 |
| θ | 8.63 |
| R | 19.00 |
| $C_4$ | $4.6972 \times 10^{-4}$ |
| $C_5$ | $-7.7322 \times 10^{-5}$ |

| ERFS[2] | |
|---|---|
| RY | −20.58 |
| θ | 5.07 |
| R | 20.00 |
| $C_4$ | $1.5978 \times 10^{-4}$ |
| $C_5$ | $-2.4314 \times 10^{-5}$ |
| $C_6$ | $-2.5066 \times 10^{-7}$ |

| YTR[1] | |
|---|---|
| Rx | −10.000 |
| Ry | ∞ |

| | | Displacement and tilt(1) | | | |
|---|---|---|---|---|---|
| X | 0.00 | Y | 0.00 | Z | 2.34 |
| α | 0.00 | β | 0.00 | γ | 0.00 |
| | | Displacement and tilt(2) | | | |
| X | 0.00 | Y | −7.98 | Z | 0.00 |
| α | 8.63 | β | 0.00 | γ | 0.00 |
| | | Displacement and tilt(3) | | | |
| X | 0.00 | Y | −7.98 | Z | 0.00 |
| α | 5.07 | β | 0.00 | γ | 0.00 |
| | | Displacement and tilt(4) | | | |
| X | 0.00 | Y | −19.79 | Z | 0.00 |
| α | 0.00 | β | 0.00 | γ | 0.00 |
| | | Displacement and tilt(5) | | | |
| X | 0.00 | Y | −13.80 | Z | 10.00 |
| α | 0.00 | β | 0.00 | γ | 0.00 |

The optical system of the invention has been described with reference to Examples 1-6. However, it is understood that if a Y toric lens is added to the object side away from the entrance pupil 4 in coaxial relation to the center axis of rotation 1, the Y toric lens is configured into a lens built up of a surface of rotational symmetry with respect to the Y-axis (the center axis of rotation 1) and the Y toric lens is allowed to have no power in the X-direction but have negative power in the Y-direction (within a section of FIG. 1, etc.), it is then possible to make large the angle of view in a sectional direction including the axis 1 of rotational symmetry. More preferably, if that toric lens is configured into a negative meniscus lens convex on the object side in the Y-Z section, it is then possible to minimize the occurrence of image distortion and, hence, make good correction of aberrations.

Further, if one Y toric lens of negative meniscus lens shape in section plus two or three lenses of meniscus shape are located on the object side of the entrance pupil 4, it is then possible to reduce the occurrence of image distortion as much as possible. It is also easy to use not only the lenses but also a reflective surface or prism rotationally symmetric with respect to the center axis of rotation 1, thereby reflecting and refracting light rays in any desired direction for projection or image formation.

Furthermore, by using the reflecting mirror and transparent medium rotationally symmetric about the center axis of rotation 1 of the optical system according to the invention as they stand, it is possible to take or project images having a full 360° direction angle of view. However, if the reflecting mirror and transparent medium are divided in a section including the center axis of rotation 1 into ½, ⅓, ⅔, etc., it is then possible to take or project images having an angle of view of 180°, 120°, 240°, etc.

The optical system of the invention has been described as adapted to project images on a cylindrical, spherical, conical or other three-dimensional display surface in a cylindrical, semispherical or other screen in the full 360° directions in the distance, while the center axis of rotation (the axis of rotational symmetry) 1 is directed in the vertical direction. If the optical path is reversed, that optical system could be used to receive images from the full 360° direction at a cylindrical, spherical, conical or other imaging surface. Further, The toric surface and extended rotation free-form surface could be built up of a Fresnel surface, and the optical system of the invention could be used as a circular viewing optical system for tract scopes such as endoscopes.

FIGS. 15(a) and 15(b) are illustrative in schematic of an optical path in the event that the optical system of the invention is used as (a) a panoramic taking optical system, and (b) a panoramic projection optical system. When it is used as the panoramic taking optical system, an imaging device 11 having a cylindrical, spherical, conical or other rotationally symmetric three-dimensional imaging surface 3 is located coaxially with the axis of rotational symmetry 1 of an optical system 10 according to the invention, as shown in FIG. 15(a). As light 13 from objects in the full 360° direction is incident on that optical system 10, it enables panoramic images to be formed on the imaging surface 3 to take them.

When it is used as the panoramic projection optical system, a display device 15 having a cylindrical, spherical, conical or other rotationally symmetric three-dimensional display surface 3 is located coaxially with the axis of rotational symmetry 1 of an optical system 10 according to the invention, as shown in FIG. 15(b). As an illumination light source 16 located behind the display surface 3 of the display device 15 is put on while the full-direction images to be projected are displayed on that display surface 3, projection light 17 from that display surface 3 passes through the optical system 10 to project the full-direction images onto a cylindrical, semicircular or other screen in the distance.

I claim:

1. An optical system adapted to project onto a full circle in the distance an object surface of three-dimensional shape that is rotationally symmetric about an axis of rotational symmetry, wherein said optical system comprises at least one rotationally symmetric reflective surface about said axis of rotational symmetry.

2. The optical system according to claim 1, wherein at least one of said rotationally symmetric reflective surfaces has positive power.

3. The optical system according to claim 1, wherein said optical system comprises, in order from back ray tracing, an entrance pupil and an exit pupil on or near an axis of rotational symmetry, and an image plane to which said at least one reflective surface and said object surface correspond and which is located off said axis of rotational symmetry, with an optical path taking on a decentered optical path form where light travels the entrance pupil, the reflective surface, the image plane and the exit pupil in this order.

4. The optical system according to claim 1, wherein said reflective surface has a rotationally symmetric shape defined by a toric surface.

5. The optical system according to claim 1, wherein said reflective surface has a rotationally symmetric shape defined by rotation about the axis of rotational symmetry of a line segment of any desired shape that has no plane of symmetry in a section including the axis of rotational symmetry.

6. The optical system according to claim 1, wherein said reflective surface has a rotationally symmetric shape defined by rotation about the axis of rotational symmetry of a line segment of any desired shape that includes an odd-numbered term in a section including the axis of rotational symmetry.

7. The optical system according to claim 1, wherein said object surface is a rotationally symmetric curved surface such as a cylindrical, spherical or conical surface.

8. The optical system according to claim 1, wherein the following condition is satisfied:

$$0.1 < EP/Rr < 10$$

where EP is a distance along the axis of rotational symmetry from an entrance pupil position to an exit pupil position, and Rr is a distance from the axis of rotational symmetry to said at least one reflective surface.

9. The optical system according to claim 1, wherein at least one of said reflective surfaces comprises a back-surface mirror.

10. The optical system according to claim 1, wherein the optical system is used as an imaging system while the object surface and a projection surface of said optical system are reversed.

* * * * *